US012544311B1

(12) United States Patent
Dewey

(10) Patent No.: US 12,544,311 B1
(45) Date of Patent: Feb. 10, 2026

(54) ORAL PRODUCT DELIVERY DEVICE

(71) Applicant: Ashley M. Dewey, Aliso Viejo, CA (US)

(72) Inventor: Ashley M. Dewey, Aliso Viejo, CA (US)

( * ) Notice: Subject to any disclaimer, the term of this patent is extended or adjusted under 35 U.S.C. 154(b) by 833 days.

(21) Appl. No.: 17/531,231

(22) Filed: Nov. 19, 2021

Related U.S. Application Data

(60) Provisional application No. 63/115,999, filed on Nov. 19, 2020.

(51) Int. Cl.
*A61J 7/00* (2006.01)
*A47G 21/18* (2006.01)

(52) U.S. Cl.
CPC .......... *A61J 7/0038* (2013.01); *A47G 21/183* (2013.01); *A61J 7/0053* (2013.01)

(58) Field of Classification Search
CPC ...... A61J 7/0038; A61J 7/0053; A61J 1/2093; A61J 1/1475; A61J 11/0005; A61J 9/00; A61J 11/04; A47G 21/183; B65D 83/0409; A61D 7/00; A61M 5/1418; A61M 1/782; A61M 39/287; A61M 39/28
See application file for complete search history.

(56) References Cited

U.S. PATENT DOCUMENTS

| | | | | | |
|---|---|---|---|---|---|
| 3,612,089 | A * | 10/1971 | Beguiristain | A61C 17/125 | 433/91 |
| 4,301,934 | A * | 11/1981 | Forestal | A61J 9/0638 | 215/11.4 |
| 4,581,013 | A * | 4/1986 | Allen | A61J 7/0053 | 604/59 |
| 5,232,193 | A * | 8/1993 | Skakoon | A61M 5/1418 | 24/130 |
| 5,269,756 | A * | 12/1993 | Dryden | A61M 16/0833 | 128/912 |
| 5,309,604 | A * | 5/1994 | Poulsen | F16L 3/223 | 24/339 |
| 2010/0092309 | A1* | 4/2010 | Hockemeier | F04B 43/084 | 417/472 |
| 2018/0280677 | A1* | 10/2018 | Knight | A61M 39/10 | |

* cited by examiner

*Primary Examiner* — Lauren P Farrar
(74) *Attorney, Agent, or Firm* — Concourse Law Group; Katherine B. Sales, Esq.

(57) ABSTRACT

An oral product delivery device and method of using same. The device comprises a main body having two opposed ends, a port coupled to and extending from the main body, a tube configured to removably couple to the port, a clip configured to removably couple to the main body, and a one-way valve disposed within the main body, below the port. The tube has a connector for removably coupling to a syringe. The clip has a flat body having two opposed ends, a flat panel, a semi-circular cut-out disposed along an end of the clip configured to removably couple to the main body, and a tear-drop shaped cut-out disposed along a middle of the clip configured to pinch the tube. The valve comprises a plurality of upper valve tabs, a lower seal, and a float positioned within the main body, between the valve tabs and the lower seal.

13 Claims, 6 Drawing Sheets

ORAL PRODUCT DELIVERY DEVICE

CROSS-REFERENCE TO RELATED APPLICATIONS

This United States Non-Provisional Patent Application claims priority to U.S. Provisional Patent Application No. 63/115,999, titled "Medicine Delivery Device," filed Nov. 19, 2020, the contents of which are incorporated by reference herein in their entirety.

BACKGROUND

It can be very difficult to get children and other individuals to take and or swallow oral liquid medicine and/or other oral liquid supplements.

Accordingly, there is a need for an oral product delivery device that makes it easier to deliver liquid medicine and or oral liquid supplements to said individuals.

SUMMARY

In a first embodiment, the present invention is directed to an oral product delivery device comprising a main body having two opposed ends, a port coupled to and extending from the main body, a tube configured to removably couple to the port, a clip configured to removably couple to the main body, and a one-way valve disposed within the main body, below the port.

The main body can be cylindrical.

The tube can have a connector for removably coupling to a syringe.

The clip can have a body having two opposed ends, a flat panel coupled to one of the opposed ends of the clip, a first cut-out disposed along the other opposed end of the clip configured to removably couple to the main body of the device, and a second cut-out disposed along a middle of the clip configured to pinch the tube.

The second cutout can be tear-drop shaped.

The one-way valve can comprise a plurality of upper valve tabs, a lower seal, and a float positioned within the main body, between the upper valve tabs and the lower seal.

In a second embodiment, the present invention is directed to a method of using the device. The method comprises the steps of a) providing the oral product delivery device; b) providing a syringe containing an oral product; c) placing one of the opposed ends of the device in a liquid beverage; d) coupling the syringe to the tube; and e) dispensing oral product from the syringe, into the tube, while an individual is drinking from the other opposed end of the device.

Step b) can be performed before or after step a), and step c) can be performed before or after step d).

DRAWINGS

These and other features, aspects, and advantages of the present invention will become better understood with regard to the following description, appended claims, and accompanying drawings.

FIG. 4 is a side plan view of the clip shown in FIG. 3;

Figure 1:
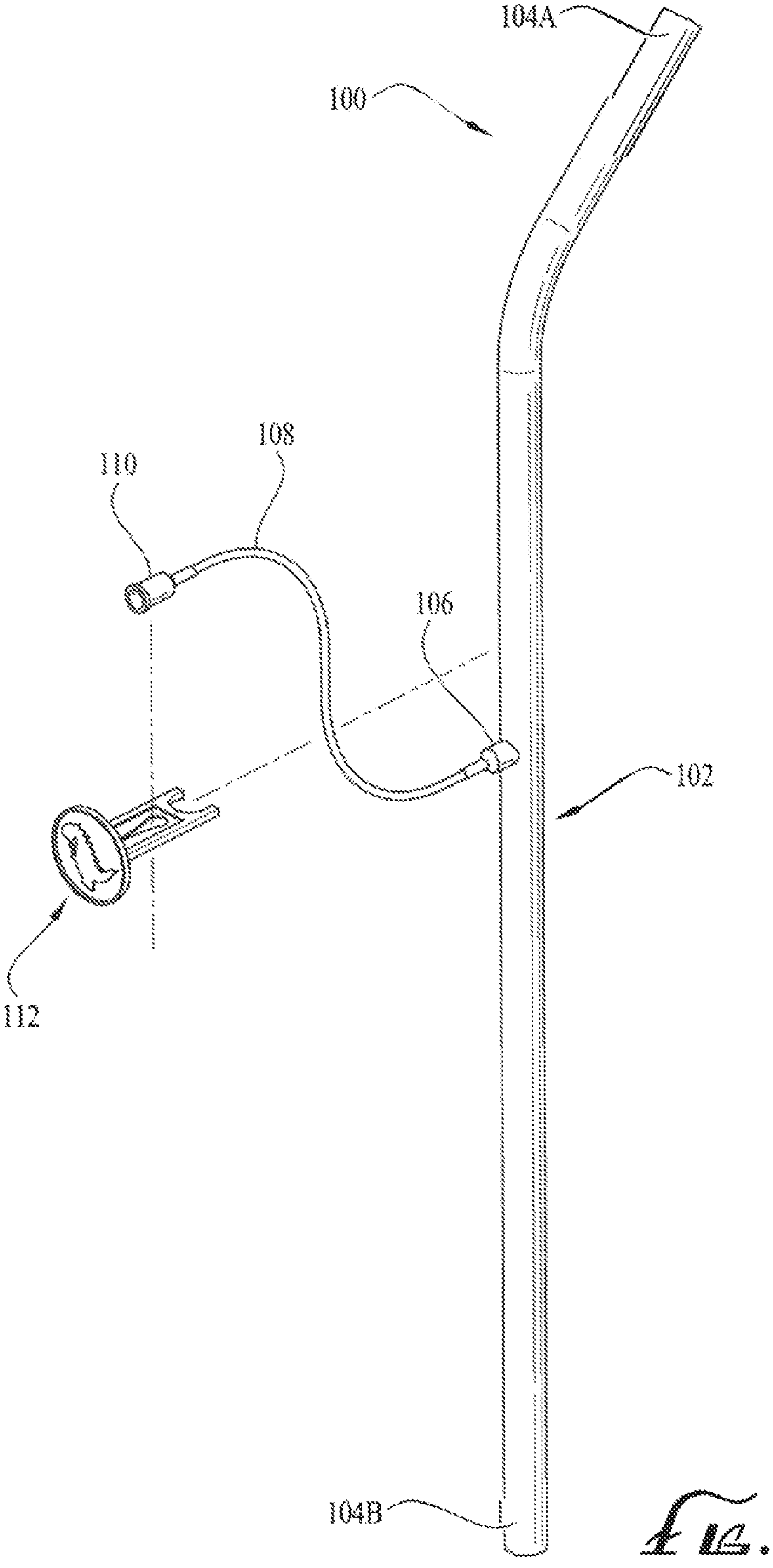
Figure 5:
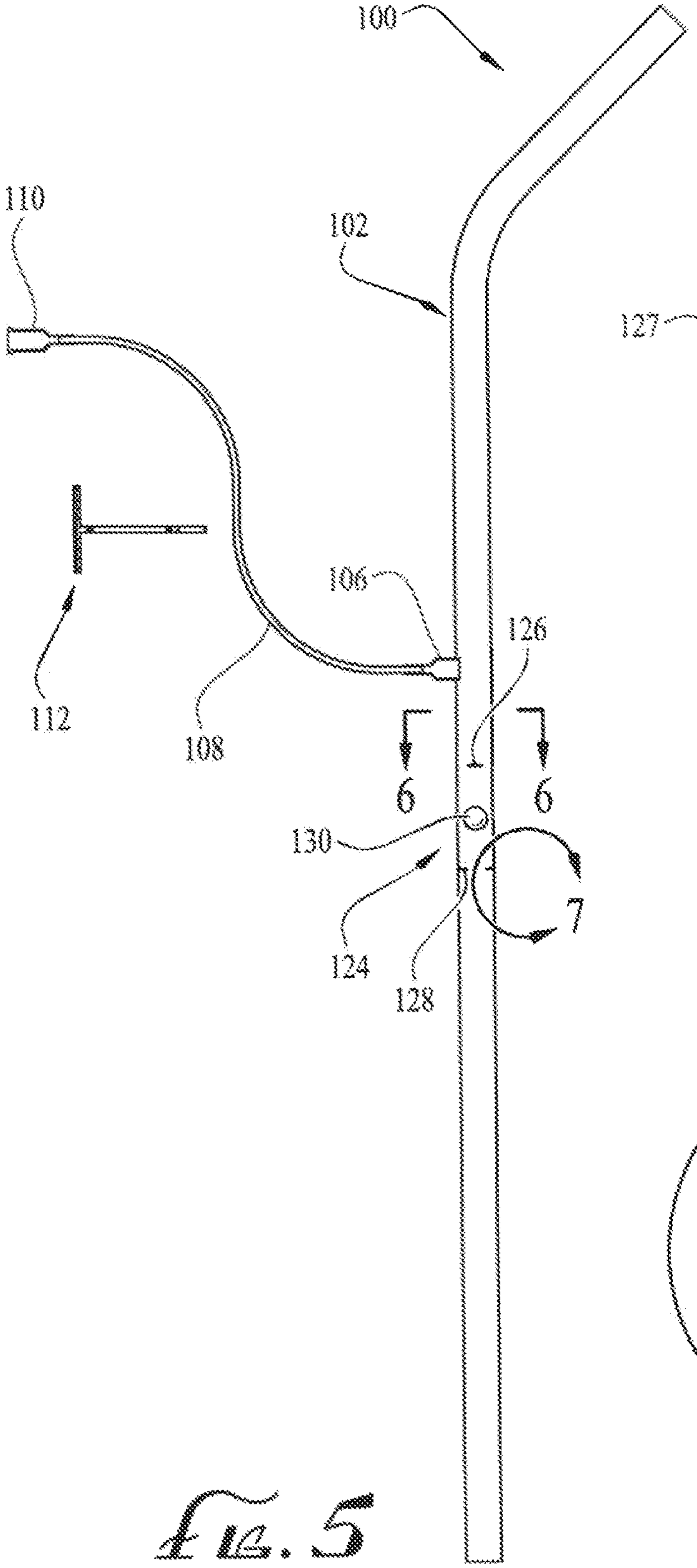
Figure 6:
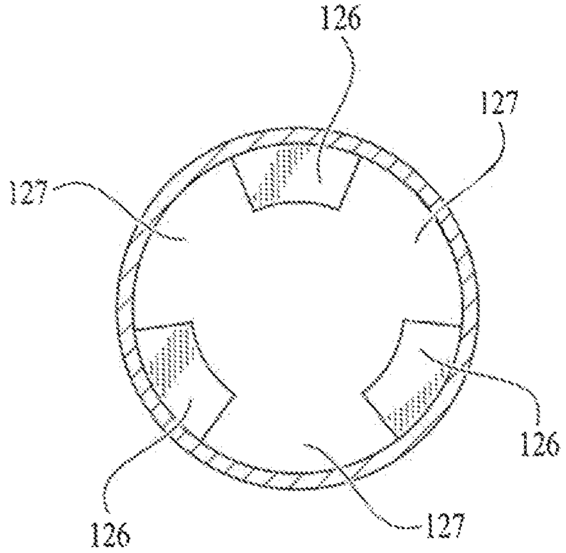
Figure 7:
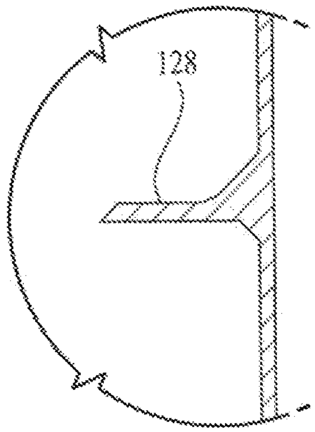
Figure 8:
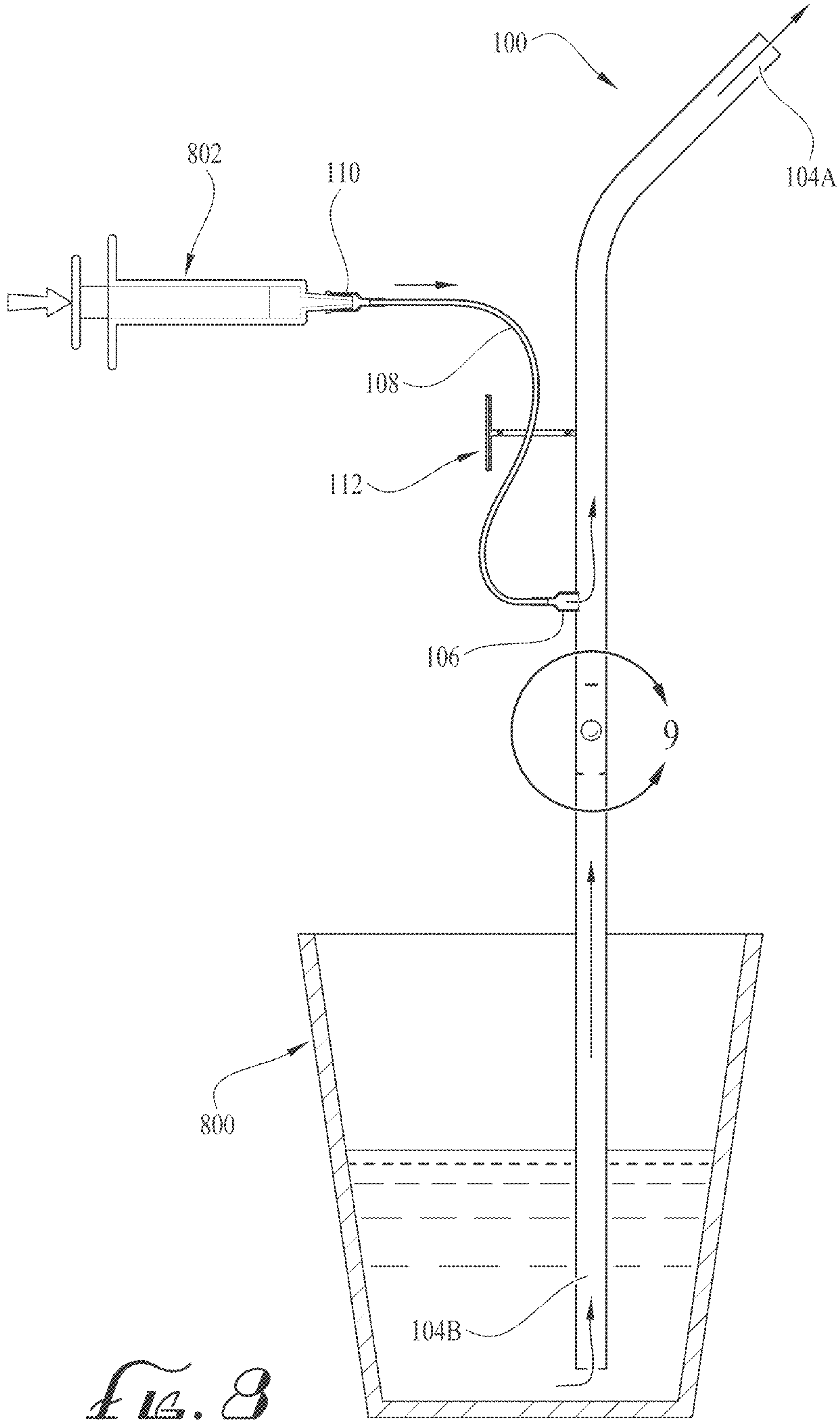
Figure 9:
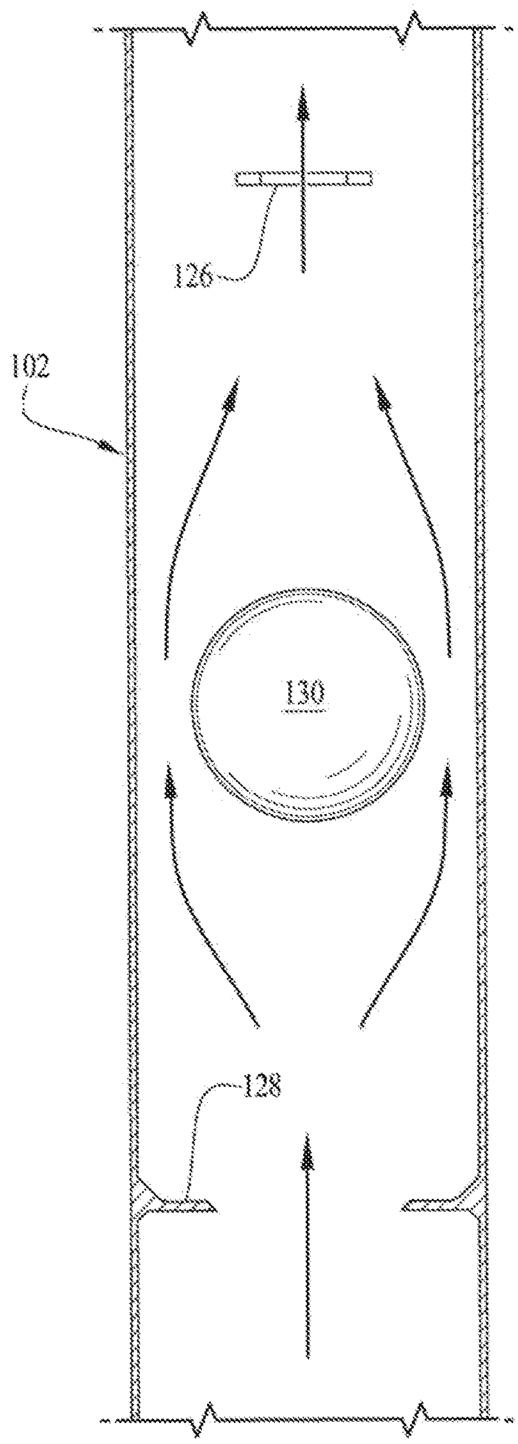
Figure 10:
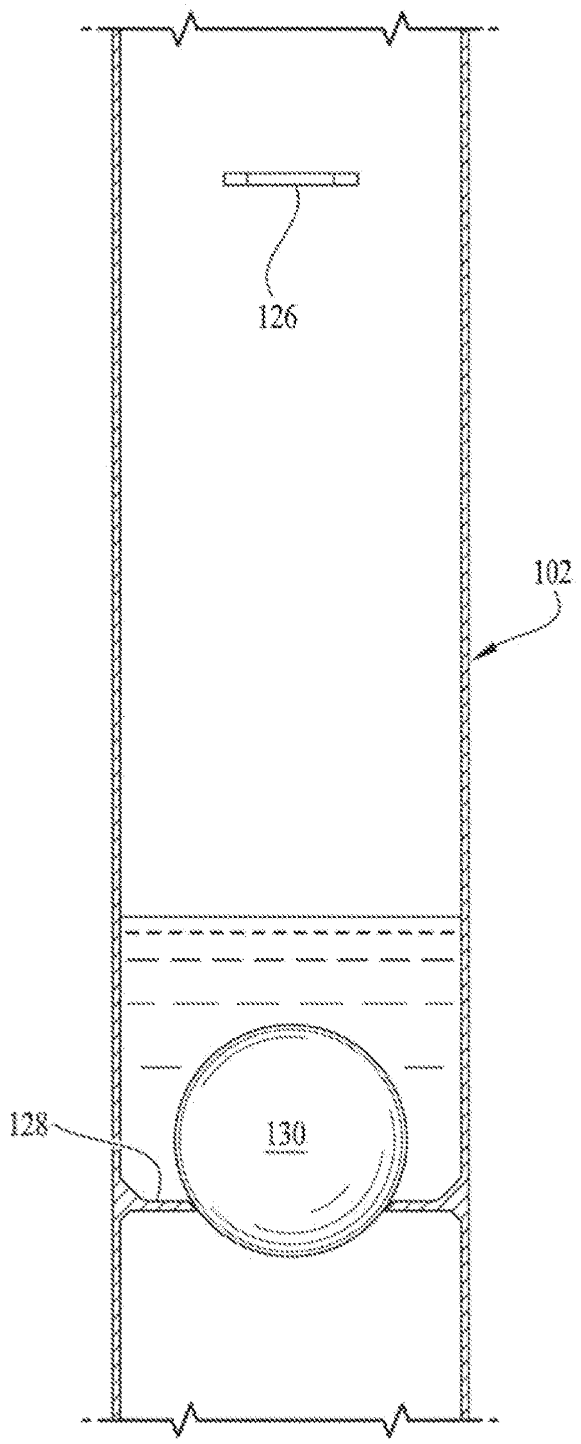
Figure 11:
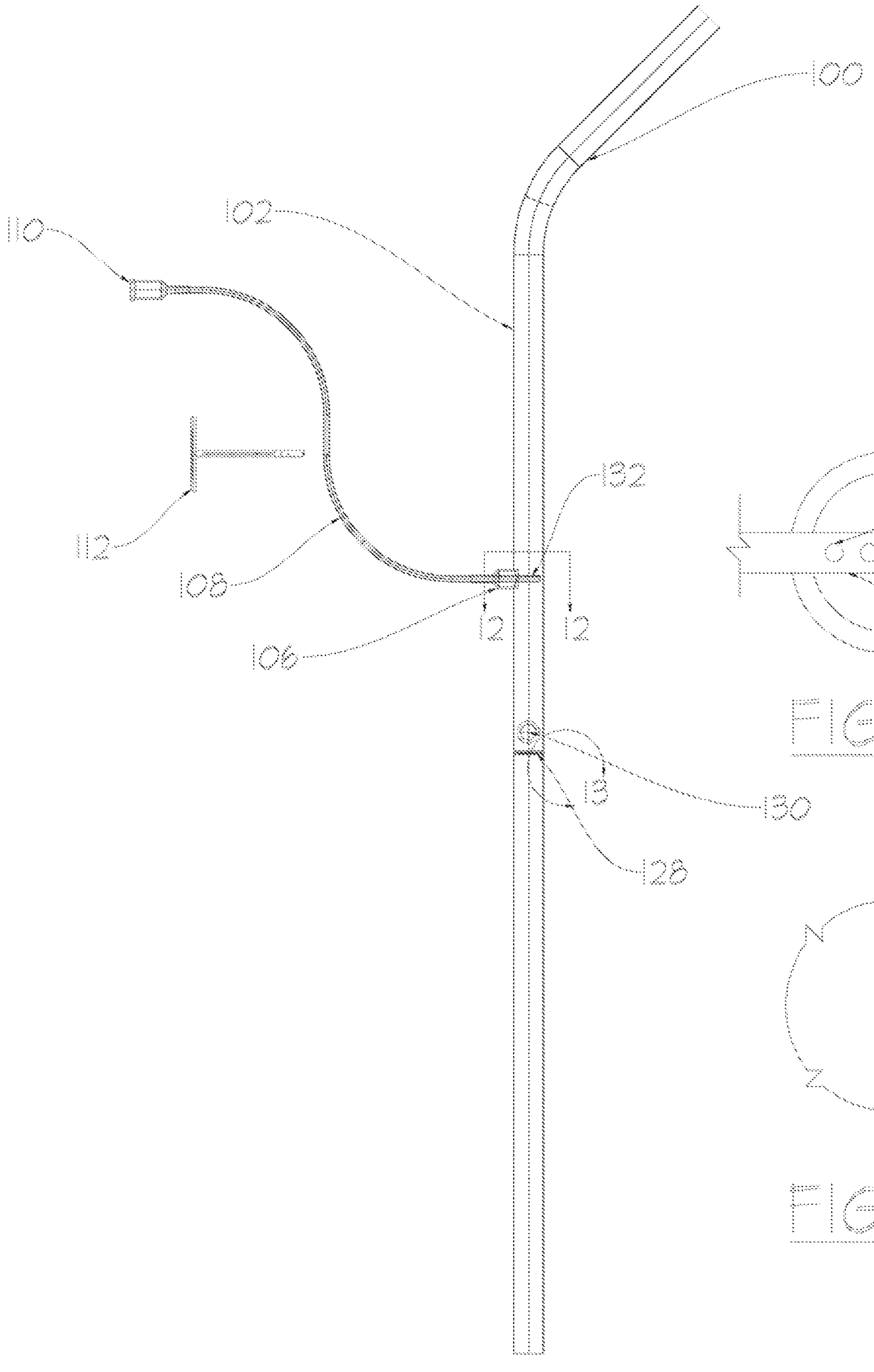
Figure 12:
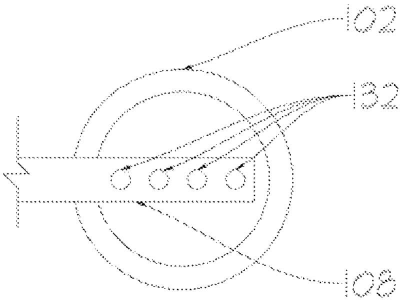
Figure 13:
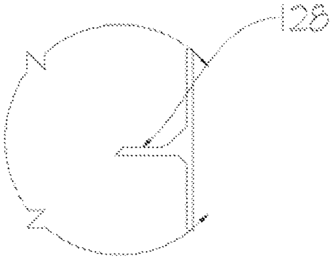

FIG. 5 a left side plan view of the oral product delivery device of FIG. 1;

FIG. 6 is a sectional, top plan view of a valve in the oral product delivery device of FIG. 1, taken along line 6-6;

FIG. 7 is an enlarged side plan view of a portion of the valve of FIG. 6, taken along line 7-7;

FIG. 8 is a sectional side plan view of the oral product delivery device of FIG. 1 being used with a syringe and drinking glass containing a liquid beverage;

FIG. 9 is sectional side plan view of the valve of FIG. 8, taken along line 9-9, wherein a flow position is shown;

FIG. 10 is a sectional side plan view of the valve of FIG. 9, wherein a no-flow position is shown:

FIG. 11 is sectional side plan view of a second embodiment of my oral product delivery device:

FIG. 12 is a detailed, sectional, top plan view of a portion of the oral product delivery device of FIG. 11, taken along line 12-12; and FIG. 13 is a detailed, sectional side plan view of a portion of the oral product delivery device of FIG. 11, taken along line 13-13.

DESCRIPTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to the FIGS. 1 through 10, there is shown a first embodiment of an oral product delivery device 100 according to the present invention. The device 100 is integrated into a reusable drinking straw. Optionally, the device 100 is configured for use with a standard disposable/one-time use plastic drinking straw, typically the kind that is made of flexible plastic and can be cut with scissors or some other sharp device.

The device 100 comprises an elongate, cylindrical, hollow main body 102 having two opposed ends 104, a top end 104A and a bottom end 104B. The top end 104A of the device 100 is the end where a user sucks up liquid therefrom, and the bottom end 104B of the device 100 is configured for placement in a liquid beverage/drinking glass 800 containing a liquid beverage. Main body 102 also has a port 106 that extends from the main body 102. The port 106 can be located anywhere along main body 102, but preferably port 106 is located along a middle portion of the device 100 so that it is further away from the individual drinking from the top end 104A, The main body 102 can be made from plastic, composite material, natural material such as bamboo or rigid paper, or metal, or any combination thereof.

Coupled to port 106 is a tube 108 that is configured to couple to a syringe 802 containing the medicine (or other oral product) to be delivered to the individual that is drinking from device 100. Tube 108 can either be removably or permanently coupled to port 106. Preferably, tube 108 has a connector 110 for removably coupling to the syringe 802. Connecting the syringe 802 directly to the port 106 is not desirable as the syringe 802 would then be positioned closer to the individual drinking from device 100 and is therefore difficult to hide from view of the individual drinking. Hiding the syringe 802 is desirable, especially if the individual drinking has an aversion to taking oral medication or other oral products. Tube 108 can be flexible or rigid, and made from plastic, a composite material, polyethylene, or metal, or any combination thereof.

Figure 2:
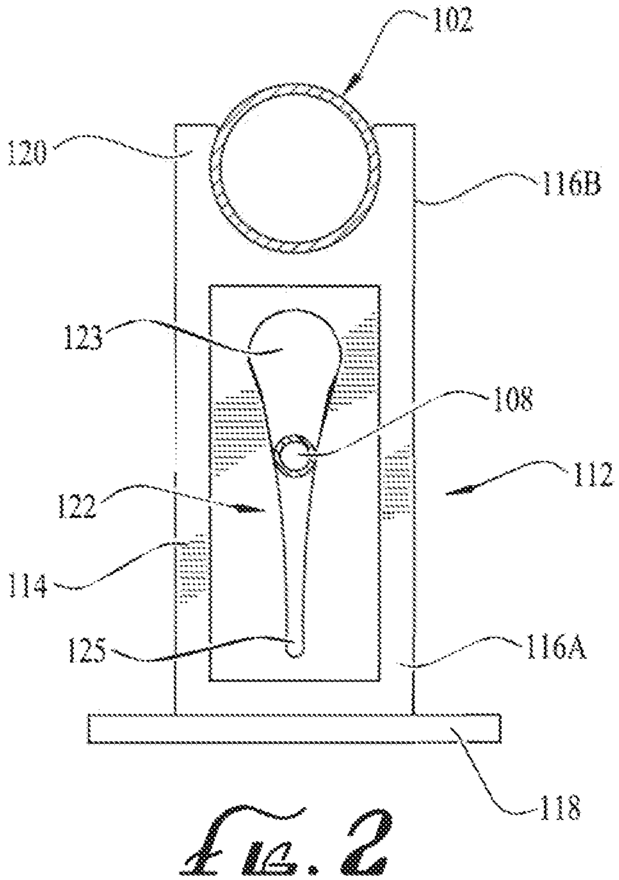
FIG. 2 is an enlarged side view of a portion of the oral product delivery device of FIG. 1.
Figure 3:
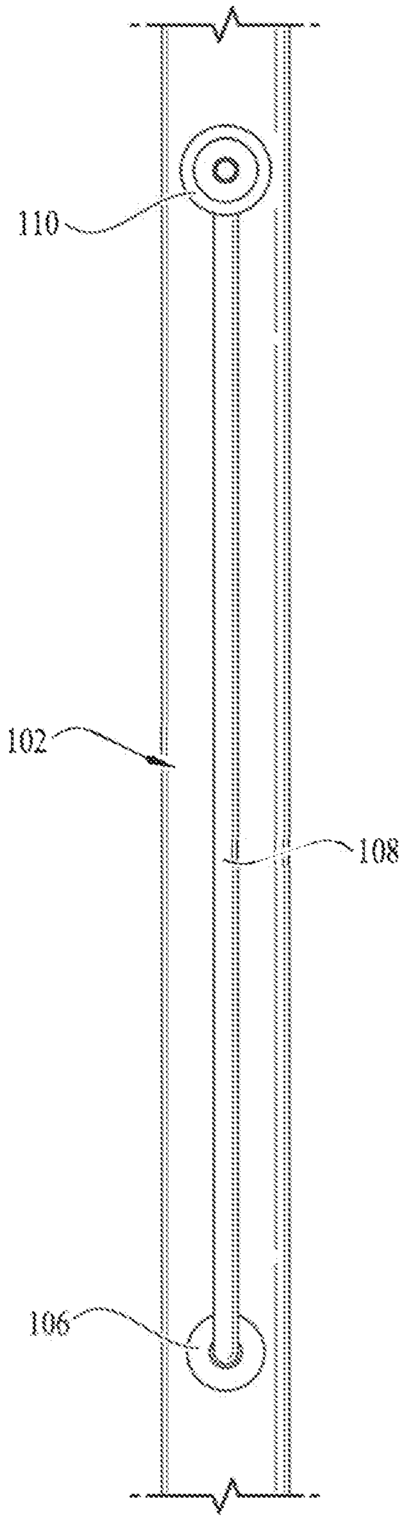
FIG. 3 is a top plan view of a clip shown in FIG. 1.
Figure 4:
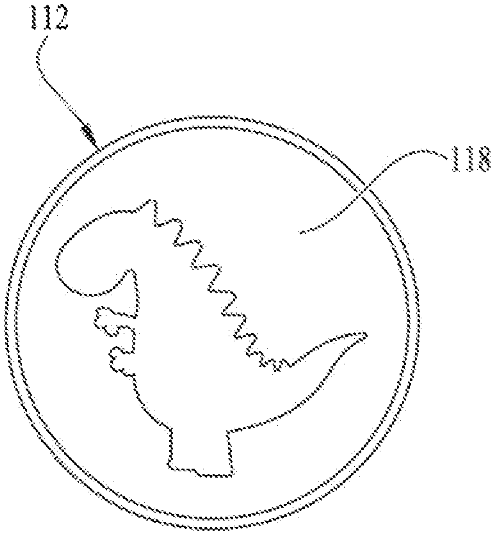
FIG. 4 is a perspective view of a first embodiment of my oral product delivery device having features of the present invention.

Optionally, as best shown in FIGS. 2 and 4, the device 100 can also comprise a clip 112 that tube 108 is threaded through, and is configured to pinch tube 108 in order to allow the individual to continue drinking from the device 100 without the syringe 802 being attached to tube 108. Clip 112 removes the need for the syringe 802 to remain attached to connector 110 so that the individual can continue drinking from device 100. If no clip 122 is used, and the syringe 802 is removed, then tube 108 remains open and air can be sucked through the tube 108, which makes it difficult to drink through the device 100.

Clip 112 comprises a roughly rectangular shaped, flat body 114 having two opposed ends 116, wherein one end 116A is coupled to and extends approximately perpendicular to a flat panel 118 against which a user can apply pressure when pinching tube 108 with the clip 112, and when coupling clip 112 to the main body 102. The flat panel 118 can be any shape, and can have any design displayed thereon. In FIG. 4, the panel 118 is circular and has a dinosaur printed on it. Clip 112 can be made from plastic, a composite material, or metal, or any combination thereof.

The other end 116B of the clip body 114 has a semi-circular cutout 120 for mating with and clamping/clipping to the curved external surface of the main body 102 when a user applies pressure to clip 112. Preferably, the cut-out 120 is configured to frictionally mate with the external surface of main body 102 so that the clip 112 stays coupled to the main body 102 until the user pulls on the clip 112, removing it from the main body 102. This coupling is best shown in FIG. 8.

The clip body 114 also has a teardrop-shaped cutout 122 disposed along a middle portion of the clip body 114 through which tube 108 is inserted and can then be pinched by sliding the tube 108 from the rounded bottom 123 of the cutout 122 to the narrow top portion 125 of the cutout 122. Pinching the tube 108 within the narrow top portion 125 of the cutout 122 prevents flow of medicine through tube 108 and into the main body 102, and allows the individual to continue drinking the beverage 800 through device 100 without also consuming medicine (or other oral product).

Referring now to FIGS. 6, 7, 9 and 10, the device 100 also comprises a one-way valve 124 disposed within the main body 102. The one-way valve 124 is positioned below the port 106 so that medicine cannot flow down into the beverage that the bottom end 104B of the device 100 is inserted into. The valve 124 comprises three components: an upper set of valve tabs 126, a lower seal 128, and a float 130 that is positioned in the space between the upper valve tabs 126 and the lower seal 128.

As shown in FIG. 6, there can be three upper valve tabs 126. Optionally, the valve tabs 126 can comprise as little as one individual tab, as long as float 130 cannot pass by the single tab 126. The important point to note is that the valve tabs 126 have open space 127 between their side surfaces, such that when the float 130 is up against the tabs 126, the open spaces 127 between the side surfaces of the tabs 126 are still open, allowing the fluid being drunk to continue freely through the valve 124.

The lower seal 128 is a circular ledge that projects into the body 102, but does not seal off the body 102.

The float 130 can be any shape, but preferably is spherical/ball shaped such that it seals against lower seal 128 when the device 100 is not being used.

Use of the device 100 is shown in FIGS. 9 and 10. As best seen in FIG. 9, when the individual is drinking from the top 104A of device 100, the float 130 is carried upward within the body 102 via the flow of drinking fluid, shown with the arrows in FIG. 9. This pulls the float 130 upward, and away from lower seal 128. Due to the upper tabs 126, float 130 is retained within the space between the lower seal 128 and the upper tabs 126. Moreover, due to the spaces 127 between the tabs 126, drinking fluid is allowed to freely flow through the valve and past the float 130.

As best seen in FIG. 10, when the individual stops drinking and the fluid being drunk is no longer flowing upward through the body 102, the float 130 falls downward and rests against the lower seal 128. When the float 130 is resting on the lower seal 128, the valve 124 is sealed such that no liquid is allowed to pass downward, through the valve 124, and into the beverage being drunk. Thus, the valve 124 prevents backflow of medicine (and other liquid) into the beverage 800. When the individual is ready to drink again, they simply suck on the top end 104A of the device 100, and the float 130 is pulled upwards, off the lower seal 128, allowing the beverage to pass through the valve 124 and into the mouth of the user. Valve 124 and all of its components can be made from plastic, a composite material, or metal, or any combination thereof.

A method of using the device comprises the steps of a) providing the oral product delivery device; b) providing a syringe containing an oral product; c) placing one of the opposed ends of the device in a liquid beverage; d) coupling the syringe to the tube; and e) dispensing oral product from the syringe, into the tube, while an individual is drinking from the other opposed end of the device.

Step b) can be performed before or after step a), and step c) can be performed before or after step d).

The device 100 has many advantages, including that a liquid medicine (or some other oral product that must be consumed), can be hidden from view while being administered to an individual, Additionally, the oral product can be administered to the individual while the individual is drinking a beverage, allowing the oral product to mix with the beverage being drunk, further hiding its consumption. Along the same lines, it is possible that the tube 108 is hidden inside a character or animal, such as a trunk of elephant, to further hide the administration of the oral product.

Referring now to FIGS. 11-13, there is shown an alternative version of my oral product delivery device 100, wherein instead of upper tabs 126, an end of tube 108 extends through port 106 (as opposed to coupling to it) and into main body 102. The end of tube 108 that is in main body 102 has at least one opening, preferably a plurality of openings 132 such that oral product can leave tube 108 and enter main body 102. Additionally, end of tube 108 also functions to prevent float 130 from being sucked out of main body 102 and swallowed by the user.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference.

Features of the invention include:

1. A medicine delivery device comprising:
a) a main body having two opposed ends;
b) a port coupled to and extending from the main body;
c) a tube configured to removably couple to the port;
d) a clip configured to removably couple to the tube and the main body; and
e) a one-way valve disposed within the main body, below the port.

2. The device of feature 1, wherein the tube further comprises a connector for removably coupling to a syringe.

3. The device of feature 1, wherein the clip comprises:
a) a roughly rectangular shaped flat body have two opposed ends;
b) a flat panel coupled to one of the opposed ends of the clip;
c) a semi-circular cut-out disposed along the other opposed end of the clip configured to removably couple to the main body of the device; and
d) a tear-drop shaped cut-out disposed along a middle of the clip configured to pinch the tube.

4. The device of feature 1, wherein die one-way valve comprises:
a) an upper set of valve tabs;
b) a lower seal; and
c) a float.

What is claimed is:

1. An oral product delivery device comprising:
a) a cylindrical main body comprising a single unitary structure, the main body having two opposed ends and comprising:
i) a port integrated into and extending from the main body between the two opposed ends of the main body;
ii) a one-way valve integrated into and disposed within the main body, below the port and between the two opposed ends of the main body, the one-way valve comprising:
(1) at least one upper valve tab;
(2) a lower seal; and
(3) a float positioned within the main body, between the at least one upper valve tab and the lower seal;
b) a tube configured to removably couple to the port, the tube comprising a connector for removably coupling to a syringe; and
c) a clip configured to removably couple to the main body, the clip comprising:
i) a roughly rectangular shaped flat body have two opposed ends;
ii) a flat panel coupled to one of the opposed ends of the clip;
iii) a semi-circular cut-out disposed along the other opposed end of the clip configured to removably couple to the main body of the device; and
iv) a tear-drop shaped cut-out disposed along a middle of the clip configured to pinch the tube.

2. A method of using an oral product delivery device, the method comprising the steps of:
a) providing the oral product delivery device of claim 1;
b) providing a syringe containing an oral product;
c) placing one of the opposed ends of the device in a liquid beverage;
d) coupling the syringe to the tube; and
e) dispensing oral product from the syringe, into the tube, while an individual is drinking from the other opposed end of the device.

3. The method of claim 2, wherein step b) can be performed before or after step a).

4. The method of claim 2, wherein step c) can be performed before or after step d).

5. An oral product delivery device comprising:
a) a main body comprising a single unitary structure, the main body having two opposed ends and comprising:
i) a port integrated into and extending from the main body between the two opposed ends of the main body; and
ii) a one-way valve integrated into and disposed within the main body, below the port and between the two opposed ends of the main body;
b) a tube configured to removably couple to the port; and
c) a clip configured to removably couple to the main body.

6. The device of claim 5, wherein the tube further comprises a connector for removably coupling to a syringe.

7. The device of claim 5, wherein the clip comprises:
a) a body having two opposed ends;
b) a flat panel coupled to one of the opposed ends of the clip;
c) a first cut-out disposed along the other opposed end of the clip configured to removably couple to the main body of the device; and
d) a second cut-out disposed along a middle of the clip configured to pinch the tube.

8. The device of claim 7, wherein the second cutout is teardrop shaped.

9. The device of claim 5, wherein the one-way valve comprises:
a) at least one upper valve tab;
b) a lower seal; and
c) a float positioned within the main body, between the at least one upper valve tab and the lower seal.

10. The device of claim 5, wherein the main body is cylindrical.

11. A method of using an oral product delivery device, the method comprising the steps of:
a) providing the oral product delivery device comprising:
i) a main body comprising a single unitary structure and having two opposed ends, the main body comprising:
(1) a port coupled to and extending from the main body; and
(2) a one-way valve disposed within the main body, below the port;
ii) a tube configured to removably couple to the port;
iii) a clip configured to removably couple to the main body; and
iv) a one-way valve disposed within the main body, below the port;
b) providing a syringe containing an oral product;
c) placing one of the opposed ends of the device in a liquid beverage;
d) coupling the syringe to the tube; and
e) dispensing oral product from the syringe, into the tube, while an individual is drinking from the other opposed end of the device.

12. The method of claim 11, wherein step b) can be performed before or after step a).

13. The method of claim 11, wherein step c) can be performed before or after step d).

* * * * *